United States Patent Office 3,317,577
Patented May 2, 1967

3,317,577
MODIFIED POLYALKYLENEAMINE SILICON COMPOUNDS
John W. Ryan, Midland, Mich., assignor to Dow Corning Corporation, Midland, Mich., a corporation of Michigan
No Drawing. Filed Oct. 22, 1962, Ser. No. 232,277
7 Claims. (Cl. 260—448.2)

This invention relates to novel organosilicon monomers, polymers and copolymers and a method for preparing such materials. More particularly, this invention relates to the reaction of a polyalkyleneamine substituted silane or siloxane and an acrylate or methacrylate and to the reaction products obtained.

It is the object of this invention to introduce a novel reaction whereby polyalkyleneamine silicon compounds are modified. An addition reaction of the hydrogen atoms bonded to the nitrogen of a polyalkyleneamine silicon group to the aliphatic unsaturation of an acrylate is also an object. Novel organosilanes and organosiloxanes are also sought. Other objects and advantages of this invention are detailed in or will be apparent from the disclosure and claims following.

This invention consists of the reaction of an organosilicon compound containing bonded directly to silicon by C—Si bonding at least one monovalent substituent of the formula

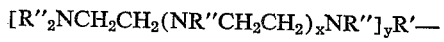

wherein $x$ has a value from 0 to 10 inclusive, R′ is a divalent or trivalent hydrocarbon radical of less than 19 carbon atoms, each R″ is a hydrogen atom or alkyl radical of 1–4 carbon atoms, at least one R″ being a hydrogen atom and $y$ is 1 or 2, with an organic compound selected from the group consisting of alkyl acrylates and alkyl methacrylates wherein the alkyl radicals contain less than 5 carbon atoms, whereby at least one of the hydrogen atoms bonded directly to nitrogen adds to the organic compound.

The reactants herein are known substances prepared by known methods. The organosilicon compounds include silanes which can be defined by the formula

wherein each R is a monovalent substituent selected from the group consisting of alkoxy radicals, hydrogen atoms, monovalent hydrocarbon radicals free of aliphatic unsaturation containing 1–18 carbon atoms and halogenated aryl radicals, each R′ is a linear or branched, divalent or trivalent hydrocarbon radical of from 1 to 18 inclusive carbon atoms, each R″ is a hydrogen atom, or a methyl, ethyl, propyl, or butyl radical, at least one R″ in each molecule being a hydrogen atom, $x$ has a value of from 0 to 10 inclusive, $n$ has a value of 1 or 2 and $y$ is 1 when R′ is divalent and 2 when R′ is trivalent.

In the defined silanes, R can be any alkoxy radical such as methoxy, ethoxy, propoxy and isoamoxy; any monovalent hydrocarbon radical free of aliphatic unsaturation containing less than 19 carbon atoms such as methyl, ethyl, propyl, butyl, octyl, nonyl, phenyl, benzyl, tolyl, cyclohexyl, anthracyl, naphthyl and phenylethyl, and halogenoaryl radicals such as bromophenyl and chlorophenyl. It is preferred that each R contain less than 4 carbon atoms. There are 2 or 3 R groups bonded to each silicon (i.e. $n$ is 1 or 2) and these can be the same or different permitting such configurations as $(CH_3O)_3Si$—, $(C_2H_5O)(CH_3O)CH_3Si$—, $(CH_3O)(CH_3)_2Si$—

$(CH_3O)CH_3Si=$, $(CH_3O)_2Si=$, $CH_3(C_2H_5)_2Si$— and many others.

The radicals represented by R′ are hydrocarbon radicals having a valence of $y+1$, (i.e. 2 or 3) and can be represented by the formulae $C_pH_{2p}=$ and $C_pH_{2p-1}\equiv$ where $p$ has a value from 1 to 18. Thus, branched and linear hydrocarbon radicals of 1 to 18 carbon atoms having a valence of 2 or 3 are represented by R′ and these radicals are bonded to silicon by C—Si bonding and to a nitrogen in the polyalkyleneamine group.

The polyalkyleneamine group represented by

—NR″(CH₂CH₂NR″)ₓCH₂CH₂NR″₂ is a diamine when $x$ is 0, a dodecaamine when $x$ is 10 and can be any intervening polyamine for values of $x$ between 0 and 10. At least one R″ in the polyamine group is a hydrogen atom and the balance of the R″ groups are lower alkyl radicals of 1 to 4 inclusive carbon atoms, i.e. methyl, ethyl, propyl and butyl radicals. In its simplest form this polyamine group has the formula —NHCH₂CH₂NH₂ and is bonded to silicon through a —CH₂CH₂CH₂— group. Obviously, the polyalkylene amine group can be illustrated by a number of species such as —NHCH₂CH₂NHCH₂CH₂NH₂,

—NXCH₂CH₂NXCH₂CH₂NXH

—NH(CH₂CH₂NX)ₓCH₂CH₂NH₂

NX(CH₂CH₂NH)ₓCH₂CH₂NX₂

—NH(CH₂CH₂NX)ₓCH₂CH₂NX₂

—NX(CH₂CH₂NX)ₓCH₂CH₂NH₂ and —NH(CH₂CH₂NH)ₓCH₂CH₂NHX where X is an alkyl radical of 1 to 4 inclusive carbon atoms. There can be one or two of the defined

—NR″(CH₂CH₂NR″)ₓCH₂CH₂NR″₂ groups bonded to silicon through each R′ group as illustrated by

—CH₂CH₂CH₂NR″(CH₂CH₂NR″)ₓCH₂CH₂NR″₂ and

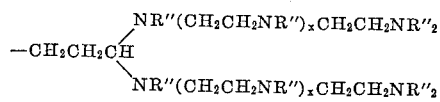

In addition to the silanes described above the orgaonsilicon reactant can be a siloxane polymer or copolymer. The operative siloxane polymers are based on a network of silicon atoms bonded through oxygen atoms to other silicon atoms to form an —Si—O—Si— skeletal structure. Some of the silicon atoms must have at least one of the defined

[R″₂NCH₂CH₂(NR″CH₂CH₂)ₓNR″]ᵧR′— groups bonded thereto. These siloxanes can be homopolymers of the unit Formula I

where R″, $x$, $y$, R′, $n$ and R are as above defined, $m$ is 0, 1, 2 or 3 and $m+n$ is less than 4. Operative copolymers contain 1 to 99 mol percent of units of Formula I and 99 to 1 mol percent of units of Formula II $$Z_mSiO_{4-m/2}$$

where $m$ is 0, 1, 2 or 3 and Z is a monovalent substituent selected from hydrogen, hydrocarbon radicals, and halogenoaryl radicals. The operative polysiloxanes range in physical state from thin fluids to rubbery gums and hard resinous materials but all of the operative polymers have the polyalkyleneamine substituent as defined above.

Particularly useful are siloxanes prepared by partially hydrolyzing the silanes of the formula

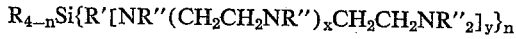

where R', R'', x, y and n are as above defined and at least some of the R substituents are hydrolyzates of silanes wherein R is methoxy or ethoxy, n is 1, y is 1, each R'' is hydrogen, x is 0 or 1 and R' is methylene, ethylene, propylene or butylene.

The alkyl acrylates and alkyl methacrylates employed herein are of the formula $CH_2=CHCOOY$ and $$CH_2=C-(CH_3)COOY$$

where Y is an alkyl radical of 1 to 4 inclusive carbon atoms. Particularly useful are the lower alkyl acrylates and methacrylates including methyl and ethyl acrylate and methacrylate.

The reactants are merely mixed together, optionally in the presence of a mutual inert organic solvent, and the reaction occurs. The reaction may require elevated temperatures to accelerate the rate of reaction particularly if higher alkyl acrylates and methacrylates are employed. It is proposed the reaction occurs according to the following equations:

(III)
$$-R'NHCH_2CH_2NH_2 + CH_2=CHCOOY \longrightarrow$$

(IV)
$$-R'NHCH_2CH_2\overset{H}{\underset{|}{N}}-CH_2CH_2COOY + CH_2=CHCOOY \longrightarrow$$

(V)
$$-R'NHCH_2CH_2N(CH_2CH_2COOY)_2 + CH_2=CHCOOY \longrightarrow$$
$$-R'N(CH_2CH_2COOY)CH_2CH_2N(CH_2CH_2COOY)_2$$

It is apparent Equation IV occurs in substantial proportions only when between one and two mols of acrylate or methacrylate is employed per mol of polyalkyleneamine present and Equation V occurs in substantial proportions only when the molar ratio of acrylate or methacrylate to polyalkyleneamine is greater than 2/1. It is also apparent that some of the reactive hydrogens noted on the nitrogen atoms can be replaced by alkyl groups thus altering the reaction sequence as may be illustrated by the following equation:

(VI) $-R'NHCH_2CH_2NR''_2 + CH_2=C(CH_3)COOY \rightarrow$
$-R'N[CH_2CH(CH_3)COOY]CH_2CH_2NR''_2$ The reactants can be employed in any desired proportions but it is preferred to employ from one to five mols of acrylate per molar equivalent of polyalkyleneamine group present in the organosilicon reactant.

The reaction products of this invention are useful as binding agents for binding pigments to glass fabric and other siliceous surfaces. They are useful as priming agents on metallic surfaces for securing adhesion of subsequently applied resin coatings. They are useful as binding agents in the preparation of glass fiber polyester laminates. Novel silicone elastomers can be prepared from the high molecular weight polymers and copolymers of this invention wherein the ratio of organic substituents to silicon atom is 2/1. Fluids prepared from the polymers and copolymers are also of interest as heat exchange agents and for further reaction to modify organic materials.

The following examples are included to aid those skilled in the art in obtaining a complete understanding of the invention and to assist in the practice of the invention. The scope of the invention is not limited by the examples but is delineated by the claims. All parts and percentages are based on weight and all temperatures are in degrees centigrade unless otherwise specified.

*Example 1*

A reaction mixture was prepared by adding 22.3 g. of a distilled silane of the formula $$(CH_3O)_3SiCH_2CH_2CH_2NHCH_2CH_2NH_2$$

to 8.6 g. of methyl acrylate. This reaction mixture thus contained one equivalent of $$-CH_2CH_2CH_2NHCH_2CH_2NH_2$$

for each equivalent of methyl acrylate. An exothermic reaction occurred upon mixing the reactants raising the reaction temperature from 28° to 52° C. The mass was cooled and a quantitative yield of $$(CH_3O)_3SiCH_2CH_2CH_2NHCH_2$$
$$CH_2NHCH_2CH_2COOCH_3$$

having a refractive index of 1.4473 was obtained. The distilled silane reactant is water soluble and the reaction product is water insoluble.

*Example 2*

An equimolar mixture of methylmethacrylate and a water soluble silane of the formula $$(CH_3O)_3SiCH_2CH_2CH_2NHCH_2CH_2NH_2$$

was heated to 70° C. for 100 minutes. The product had an index of refraction ($n_D^{25}$) of 1.4420 and was insoluble in water.

*Example 3*

An equimolar mixture of 6 mols of methyl acrylate and 6 equivalents of a water soluble silane of the formula $$(CH_3O)_3SiCH_2CH_2CH_2NHCH_2CH_2NH_2$$

was added to a flask. An exothermic reaction occurred and was permitted to go to completion. The reaction product (A) was water insoluble and was $$(CH_3O)_3SiCH_2CH_2CH_2NHCH_2$$
$$CH_2NHCH_2CH_2COOCH_3$$

$n_D^{25} = 1.4572$. A portion consisting of two-thirds of the reaction product (A) was taken and admixed with 4 mols of methyl acrylate and an exothermic reaction occurred. The reaction was permitted to go to completion and a water insoluble silane (B) of the formula $$(CH_3O)_3SiCH_2CH_2CH_2NHCH_2$$
$$CH_2N(CH_2CH_2COOCH_3)_2$$

was obtained, $n_D^{25} = 1.4580$. A portion of the silane (B) was taken and further mixed with methyl acrylate. The reaction mass was heated at 88° C. for 8 hours. The reaction product obtained was a water insoluble silane of the formula $$(CH_3O)_3SiCH_2CH_2CH_2N(CH_2CH_2COOCH_3)$$
$$CH_2CH_2N(CH_2CH_2COOCH_3)_2$$

having a refractive index ($n_D^{25}$) of 1.4557.

*Example 4*

Equivalent results were achieved when Example 1 was repeated employing an equivalent proportion of ethyl acrylate, ethyl methacrylate and butyl acrylate in place of the methyl acrylate employed therein.

*Example 5*

Equivalent results were achieved when Example 1 was repeated employing chemically equivalent proportions of the following in place of the silane employed in Example 1:

$(C_2H_5O)_3SiCH_2CH_2CH_2NHCH_2CH_2NH_2$
$(CH_3)(C_3H_7O)_2SiCH_2CH_2CH_2NHCH_2CH_2NH_2$
$(C_6H_5)(CH_3O)_2SiCH_2CH(CH_3)CH_2NHCH_2CH_2NH_2$
$(CH_3)_2(CH_3O)SiCH_2CH_2CH(NHCH_2CH_2NH_2)_2$
$H(CH_3O)_2SiCH_2(CH_2CH_2NH)_2CH_2CH_2NH_2$
$(CH_3)(C_2H_5O)(CH_3O)SiCH_2CH_2$
$\quad CH_2NHCH_2CH(CH_3)NH_2$
$(C_2H_5)(C_3H_7O)_2SiCH_2CH_2CH_2N$
$\quad (CH_3)CH_2CH_2N(CH_3)H$
$(CH_3)(H_2NCH_2CH_2NHCH_2CH_2CH_2)SiO$ polymers.

Example 6

Equivalent results were achieved when methyl acrylate was reacted with siloxanes of the following unit formulae in accordance with the method of Example 2:

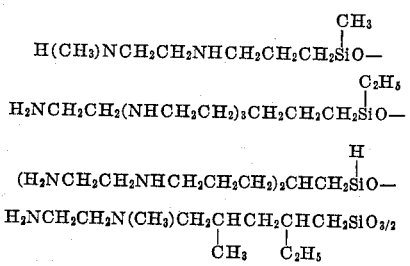

and copolymers containing 10 mol percent of the above siloxane units and 90 mol percent of $(CH_3)_2SiO$ units.

Example 7

A flask was charged with 36.6 g. (.1 equivalent of $NH_2$) siloxane of the formula

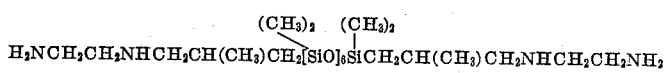

and 8.6 g. (.1 mol) of $CH_2$=$CHCOOCH_3$ was added. An exothermic reaction occurred and a modified siloxane was obtained of the formula

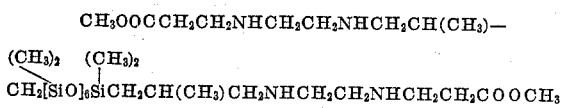

having a refractive index ($n_D^{25}$) of 1.4390.

Example 8

A hydrolyzable silane of the formula

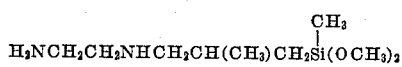

was added to an equimolar amount of water (mol ratio of reactants 1/1), to produce a siloxane of the unit formula

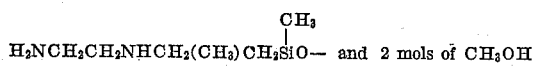 and 2 mols of $CH_3OH$

The methanol produced was removed from the siloxane reaction product by heating. The siloxane product was added to a chemically equivalent quantity of $$CH_2=CHCOOCH_3$$

and an exothermic reaction occurred producing an oily, colorless liquid of the unit formula

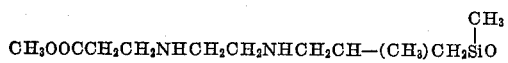

having a refractive index ($n_D^{25}$) of 1.4586.

That which is claimed is:

1. A silane of the formula

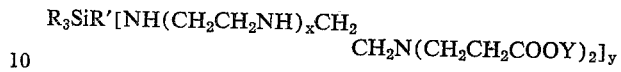

wherein each R is a monovalent substituent selected from the group consisting of alkoxy radicals, hydrogen atoms, hydrocarbon radicals free of aliphatic unsaturation containing from 1 to 18 inclusive carbon atoms and halogenoaryl radicals, R' is a saturated hydrocarbon radical of the formula selected from the group consisting of $C_pH_{2p}=$ and $C_pH_{2p-1}\equiv$ where p has a value from 1 to 18 inclusive being divalent when y is 1 and trivalent when y is 2, y has a value from 1 to 2 inclusive, x has a value of from 0 to 10 inclusive, Y is an alkyl radical containing from 1 to 4 inclusive carbon atoms.

2. A silane of the formula

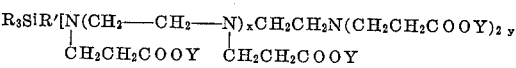

wherein each R is a monovalent substituent selected from the group consisting of alkoxy radicals, hydrogen atoms, hydrocarbon radicals free of aliphatic unsaturation containing from 1 to 18 inclusive carbon atoms and halogenoaryl radicals, R' is a saturated hydrocarbon radical of the formula selected from the group consisting of $C_pH_{2p}=$ and $C_pH_{2p-1}\equiv$ where p has a value from 1 to 18 inclusive being divalent when y is 1 and trivalent when y is 2, y has a value from 1 to 2 inclusive, x has a value of from 0 to 10 inclusive, Y is an alkyl radical containing from 1 to 4 inclusive carbon atoms.

3. A silane of the formula $R_3SiR'[N(CH_2$——$CH_2$——$N)_xCH_2CH_2N(CH_2CH_2COOY)_2$ $_y$
$\quad\quad\quad\quad\quad$ $\overset{|}{CH_2CH_2COOY}$ $\overset{|}{CH_2CH_2COOY}$ wherein each R is a monovalent substituent selected from the group consisting of alkoxy radicals, hydrogen atoms, hydrocarbon radicals free of aliphatic unsaturation containing from 1 to 18 inclusive carbon atoms and halogenoaryl radicals, R' is a saturated hydrocarbon radical of the formula selected from the group consisting of $C_pH_{2p}=$ and $C_pH_{2p-1}\equiv$ where p has a value from 1 to 18 inclusive being divalent when y is 1 and trivalent when y is 2, y has a value from 1 to 2 inclusive, x has a value of from 0 to 10 inclusive, Y is an alkyl radical containing from 1 to 4 inclusive carbon atoms.

4. The silane of the formula $(CH_3O)_3SiCH_2CH_2CH_2NHCH_2$
$\quad\quad\quad\quad\quad\quad\quad\quad CH_2NHCH_2CH_2COOCH_3$ 5. The silane of the formula $(CH_3O)_3SiCH_2CH_2CH_2NHCH_2$
$\quad\quad\quad\quad\quad\quad\quad\quad CH_2NHCH_2CH(CH_3)COOCH_3$ 6. The silane of the formula $(CH_3O)_3SiCH_2CH_2CH_2NHCH_2$
$\quad\quad\quad\quad\quad\quad\quad\quad CH_2N(CH_2CH_2COOCH_3)_2$ 7. The silane of the formula $(CH_3O)_3SiCH_2CH_2CH_2N(CH_2CH_2COOCH_3)$
$\quad\quad\quad\quad\quad\quad\quad\quad CH_2CH_2N(CH_2CH_2COOCH_3)_2$

References Cited by the Examiner

UNITED STATES PATENTS

| | | | |
|---|---|---|---|
| 2,754,311 | 7/1956 | Elliott | 260—448.2 |
| 2,971,864 | 2/1961 | Speier | 260—448.2 |
| 3,033,815 | 5/1962 | Pike et al. | 260—448.2 |
| 3,087,909 | 4/1963 | Morehouse et al. | 260—448.2 |

FOREIGN PATENTS 1,230,820　4/1960　France.

TOBIAS E. LEVOW, *Primary Examiner.*

SAMUEL H. BLECH, HELEN M. McCARTHY,
$\quad\quad\quad\quad\quad\quad\quad\quad\quad\quad\quad\quad$ *Examiners.*

P. F. SHAVER, *Assistant Examiner.*

UNITED STATES PATENT OFFICE
CERTIFICATE OF CORRECTION

Patent No. 3,317,577                               Dated: May 2, 1967

John W. Ryan

It is certified that errors appear in the above identified patent and that said Letters Patent are hereby corrected as shown below:

Col. 2, line 57 - after the last brace the formula reads "$\}_n \overset{R_m}{S}_1 O_{4-m-n/2}$". It should read "$\}_n \overset{R_m}{S}i O_{4-m-n/2}$".
The $_1$ should be i.

Col. 6, line 30 - after the last parenthesis the formula reads "$)_2 y$". It should read "$)_2 ]_y$".
There should be a ] between $_2$ and $_y$.

Signed and sealed this 28th day of March 1972.

(SEAL)
Attest:

EDWARD M. FLETCHER, JR.          ROBERT GOTTSCHALK
Attesting Officer                Commissioner of Patents